United States Patent
Matsumoto

(10) Patent No.: US 6,270,426 B1
(45) Date of Patent: *Aug. 7, 2001

(54) GOLF CLUB SHAFT

(75) Inventor: Norio Matsumoto, Fukushima-ken (JP)

(73) Assignee: Fujikura Rubber Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,756

(22) Filed: Dec. 15, 1998

(30) Foreign Application Priority Data

Apr. 27, 1998 (JP) .................................. 10-117161
Jun. 4, 1998 (JP) .................................. 10-155842

(51) Int. Cl.$^7$ .................................................. A63B 53/10
(52) U.S. Cl. ........................................... 473/319; 473/322
(58) Field of Search ..................................... 473/316–323

(56) References Cited

U.S. PATENT DOCUMENTS 3,998,458 * 12/1976 Inoue .
4,157,181 * 6/1979 Cecka .
4,690,850 * 9/1987 Fezio .
5,143,374 * 9/1992 Shibasaki .
5,419,231 * 5/1995 Earle .
5,556,677 * 9/1996 Quigley .
5,653,646 * 8/1997 Negishi ................................ 473/319
5,720,671 * 2/1998 Cheng ................................. 473/305
5,810,676 * 9/1998 Bird .................................... 473/319
5,897,447 * 4/1999 Nishihara ............................ 473/535
5,952,067 * 9/1999 Head ................................... 428/36.3
5,979,288 * 11/1999 Gallagher ............................ 87/36

* cited by examiner

Primary Examiner—Jeanette Chapman
Assistant Examiner—Stephen L. Blau
(74) Attorney, Agent, or Firm—McCormick, Paulding & Huber LLP

(57) ABSTRACT

A golf club shaft made of a composite of a fiber material and a synthetic resin material, wherein the fiber material includes triaxial fabric layers which are located at least on the butt end side and the tip end side of the golf club shaft. Either the fiber density, the kind of the fiber, the physical property of the fiber, or a combination of two or more thereof, of yarn paths of three directions that form the triaxial fabric layers is varied with respect to the longitudinal axis of the shaft in accordance with a required specification of the shaft.

13 Claims, 10 Drawing Sheets

Fig. 11
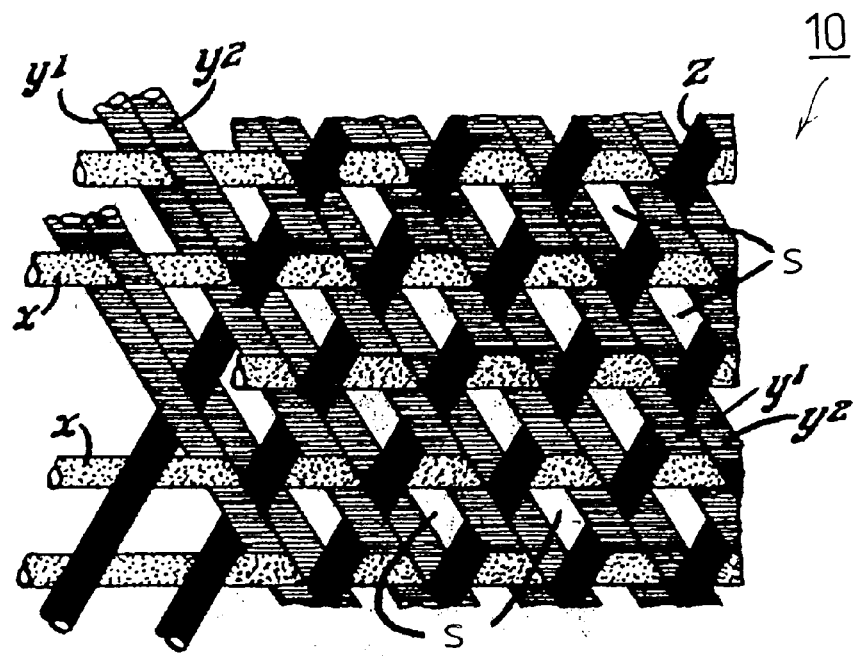
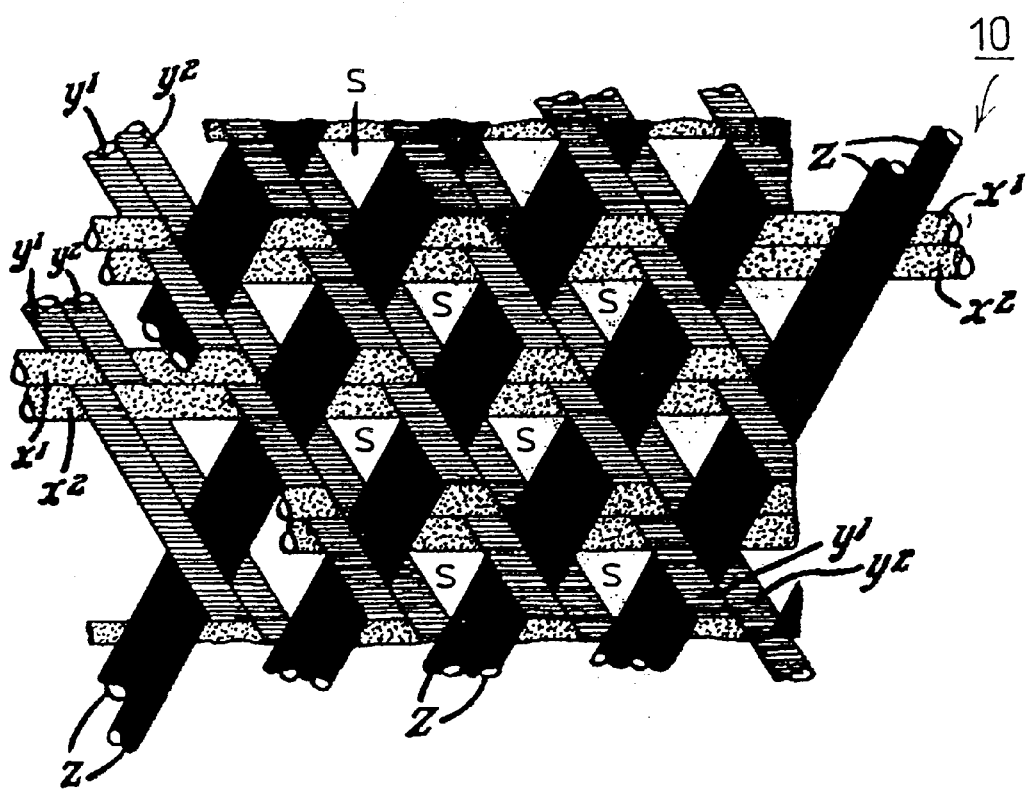
Fig. 12

Fig. 14
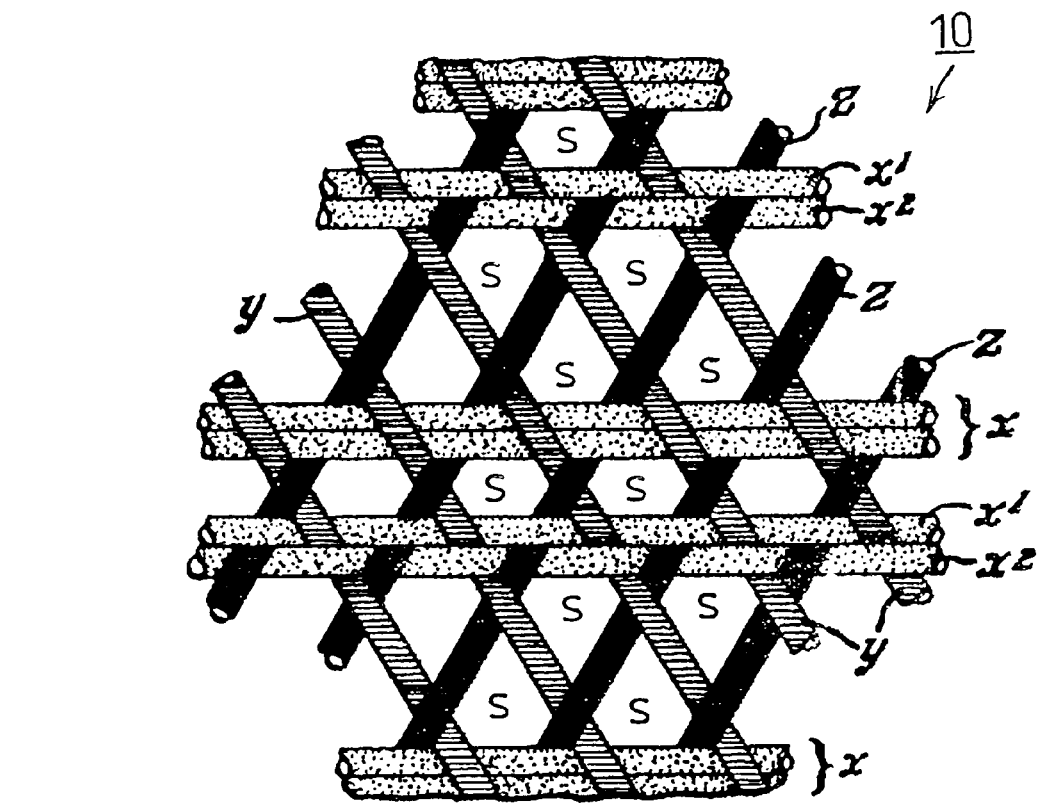
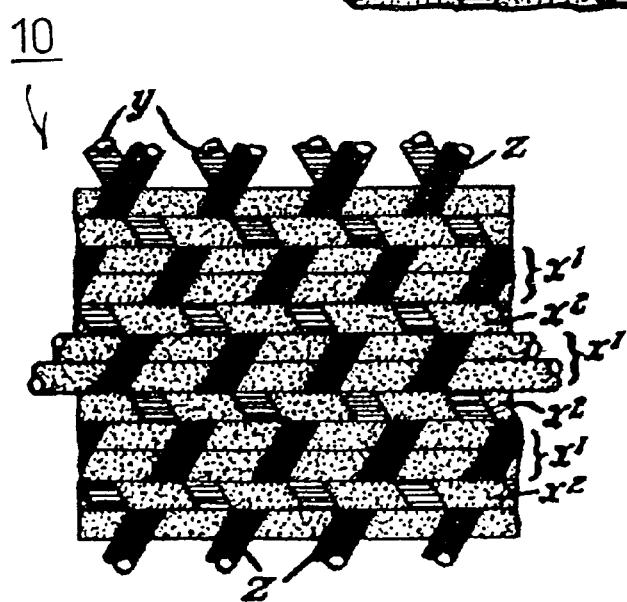
Fig. 15

GOLF CLUB SHAFT

BACKGROUND OF THE INVENTION

1. Field of the Invention

The present invention relates to a golf club shaft made of a composite of a fiber material and a synthetic resin material.

2. Description of the Related Art

Recently, a golf club shaft is made of a combination of a fiber material such as glass fiber or carbon fiber, and a compound synthetic resin. It is known for fiber material to be formed as a diagonal fiber layer, an axial fiber layer, a triaxial fabric layer; or a combination thereof. A diagonal fiber layer refers to a fiber layer in which pairs of yarn paths defined by fiber bundles are inclined in opposite directions with respect to the longitudinal axis of the shaft. An axial fiber layer refers to a fiber layer in which the yarn paths extend in parallel with the longitudinal axis of the shaft. A triaxial fabric layer refers to a fabric layer in which yarns are woven so that three directions of the yarn paths form approximately 60° or 120°. These fiber or fabric materials are provided with thermoplastic resin or thermosetting resin impregnated therein to form a prepreg, which is then wound by several turns, and is hardened to obtain a golf club shaft.

The assignee of the present application has proposed a golf club shaft made of a triaxial fabric (layer) in Japanese Utility Model Registration No. 2,553,611 or No. 2,553,612, and has marketed the same. In these utility model applications, it was considered essential or preferable that the triaxial fabric layer be uniformly provided over the entire length of the shaft, and one of the yarn paths to extend in the axial direction of the shaft.

However, it has been found by recent studies of triaxial fabrics that it is not necessary for the triaxial fabric layer to be uniformly provided over the entire length of the shaft, nor for one of the yarn paths to extend in the axial direction of the shaft; furthermore, triaxial fabrics having a variety of specifications can be advantageously used to respond to various requirements of a golf club shaft.

SUMMARY OF THE INVENTION

It is an object of the present invention to provide a golf club shaft made of a composite of a fiber material and a synthetic resin material, wherein the bending rigidity, the torsional rigidity or the deformation rigidity (rigidity against the partial collapse of the circular shape in section), etc., is achieved so as to be varied in accordance with need in the direction of the longitudinal axis of the shaft.

To achieve the object mentioned above, according to an aspect of the present invention, there is provided a golf club shaft made of a composite of a fiber material and a synthetic resin material, wherein the fiber material is composed of triaxial fabric layers having three yarn paths of three directions which are located at least on the butt end side and the tip end side of the golf club shaft; wherein either the fiber density, the kind of fiber, the physical property of the fiber, or a combination of two or more thereof, of the yarn paths of three directions that form the triaxial fabric layers, is varied with respect to the longitudinal axis of the shaft in accordance with a required specification of the shaft.

Preferably, the fiber density of the triaxial fabric layers is determined based on either the specification of the triaxial fabric layer, the arrangement of the triaxial fabric layer, or both the specification and arrangement thereof.

Preferably, the specification of the triaxial fabric layers is determined based on either the kind, the number, the distance, the thickness, or a combination of one or more thereof, of the fiber of the yarn paths of three directions.

Preferably, the yarn paths in three directions have different numbers of fibers.

The arrangement of the triaxial fabric layers can be such that a plurality of triaxial fabric layers having different winding radii in the axial direction of the shaft mutually overlap each other in part.

Alternatively, the arrangement of the triaxial fabric layers is such that the triaxial fabric layers are spaced from one another in the axial direction of the shaft.

Alternatively, a plurality of triaxial fabric layers which are multi-layered are provided so that the direction of the yarn paths of the triaxial fabric layers are different from one another.

Preferably, the triaxial fabric layers includes at least one layer which extends along the overall length of said golf club shaft and another triaxial fabric layer which does not extend along the overall length of the golf club shaft.

Preferably, the fiber of the triaxial fabric layers is selected from one or more of the following: carbon fiber, alumina fiber, aramid fiber, tyranno fiber, amorphous fiber, or glass fiber.

Preferably, the physical property of the triaxial fabric layers includes either a high tensile strength, a high tensile elasticity modulus, or a combination of both.

The present disclosure relates to subject matter contained in Japanese Patent Application No.10-117161 (filed on Apr. 27, 1998) and Japanese Patent Application No. 10-155842 (filed on Jun. 4, 1998) which are expressly incorporated herein by reference in their entireties.

BRIEF DESCRIPTION OF THE DRAWINGS

The invention will be discussed below in detail with reference to the accompanying drawings, in which:

FIGS. 7 through 16 are plan views of different examples of a triaxial fabric usable in the present invention.

DESCRIPTION OF THE PREFERRED EMBODIMENT

Figure 6:
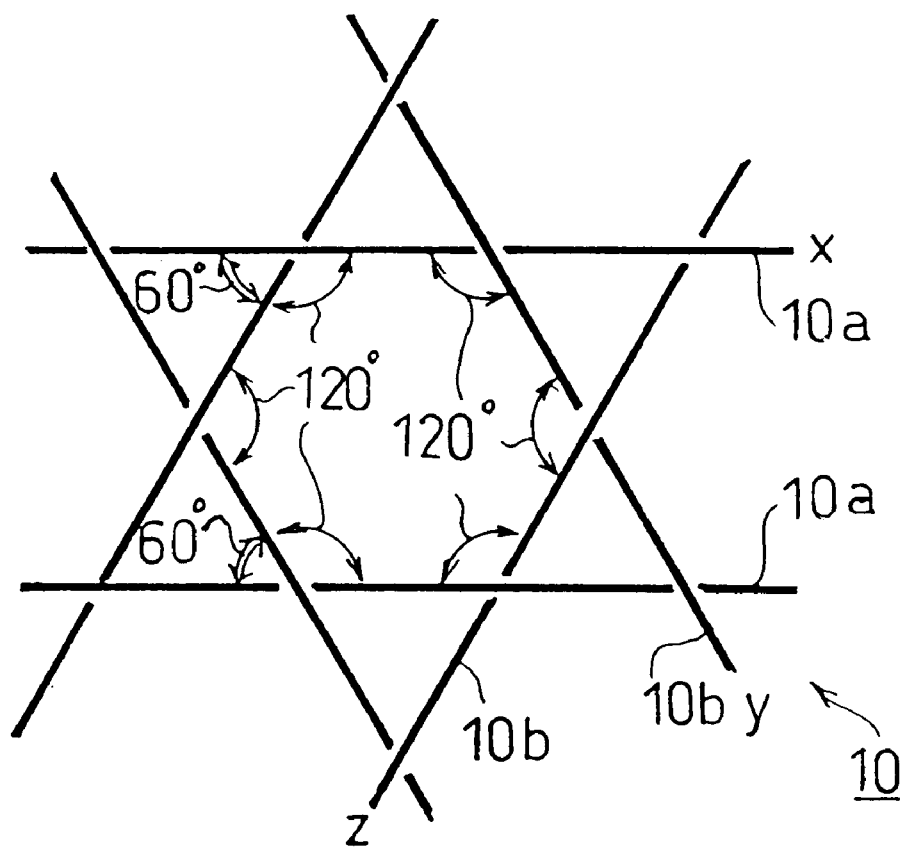
FIG. 6 is a schematic plan view of yarn paths of a triaxial fabric used in a golf club shaft according to the present invention.

A triaxial fabric which constitutes a triaxial fabric prepreg 10 is formed by weaving threads of the three-direction yarn paths x, y, and z which form approximately 60° or 120° therebetween, as schematically shown in FIG. 6. The fabric prepreg is in the form of a sheet of thermoplastic or thermosetting resin with which the fabric is impregnated. Since the directions of the fibers in the prepreg are fixed by the resin, no accidental movement of the direction of the fibers occurs. Epoxy resin, unsaturated polyester resin, phenyl resin, vinyl ester resin, or peek resin (poly ether ether ketone resin), can be used as the resin for the prepreg.

Carbon fiber, alumina fiber, aramid fiber, tyrano fiber (trade name; Si—Ti—C—O fiber, fiber with a silicon-titanium-carbon-oxygen base), amorphous fiber, or a glass fiber can be used as the fiber to form the yarn paths x, y and z. The carbon fiber to be used can be either PAN(poly crylonitrile)-based carbon fiber or pitch-based carbon fiber. The above mentioned fibers have different physical properties. For the same fiber, it is possible to provide different tensile strengths or tensile elasticity moduli.

The thickness of the fiber (thread) which constitutes the yarn paths x, y and z is in the range of 0.1 to 3 K (1 K=7 $\mu$m×1000). The number (pitch) of the implanted fibers for a unit length is in the range of 2 to 20 fibers per centimeter. Several kinds of triaxial fabric prepregs 10 are prepared by appropriately combining the thicknesses of a number of fibers.

Figure 7:
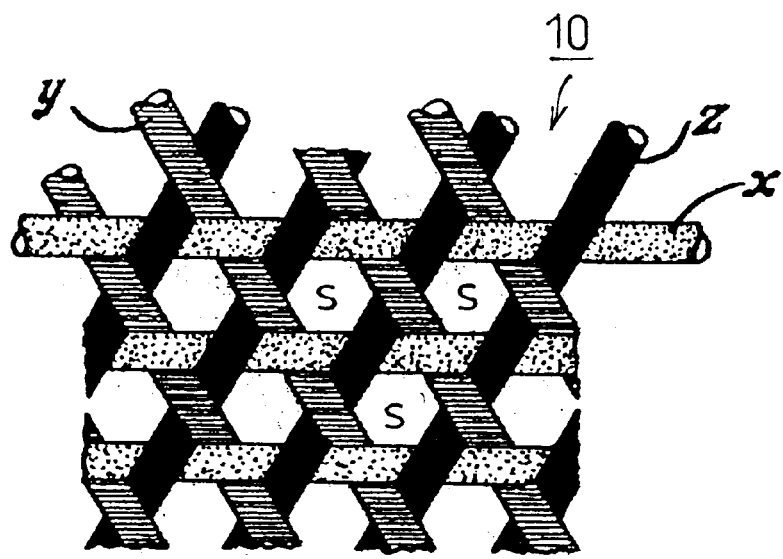
Figure 8:
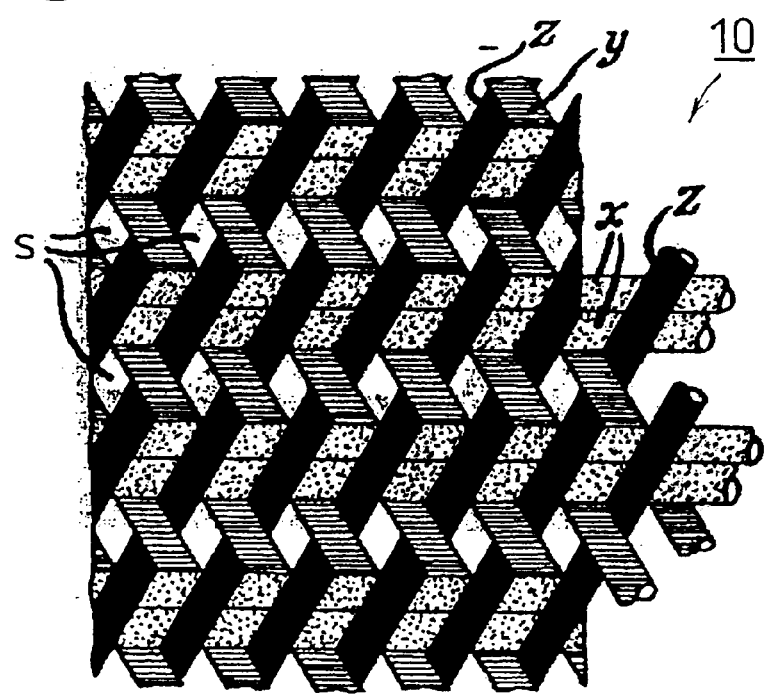
Figure 9:
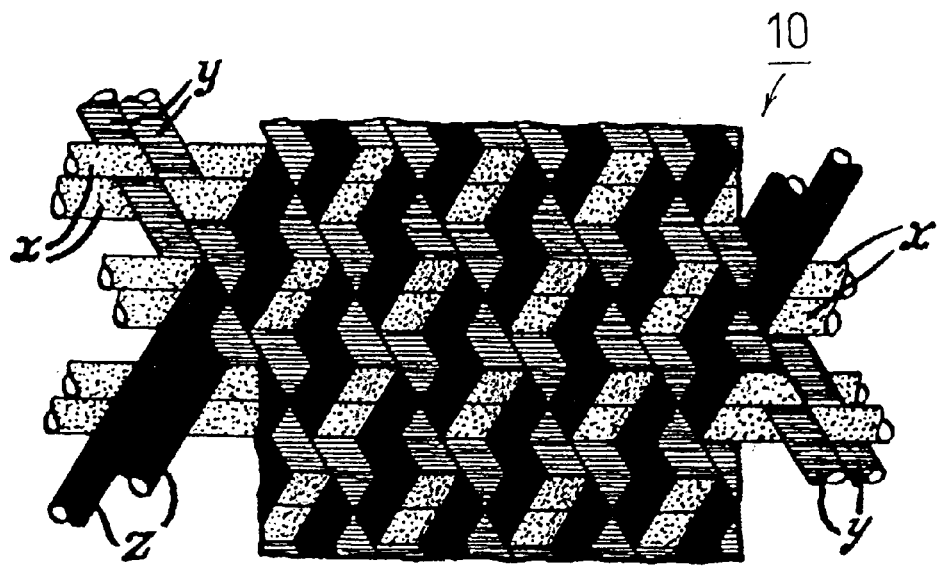
Figure 10:
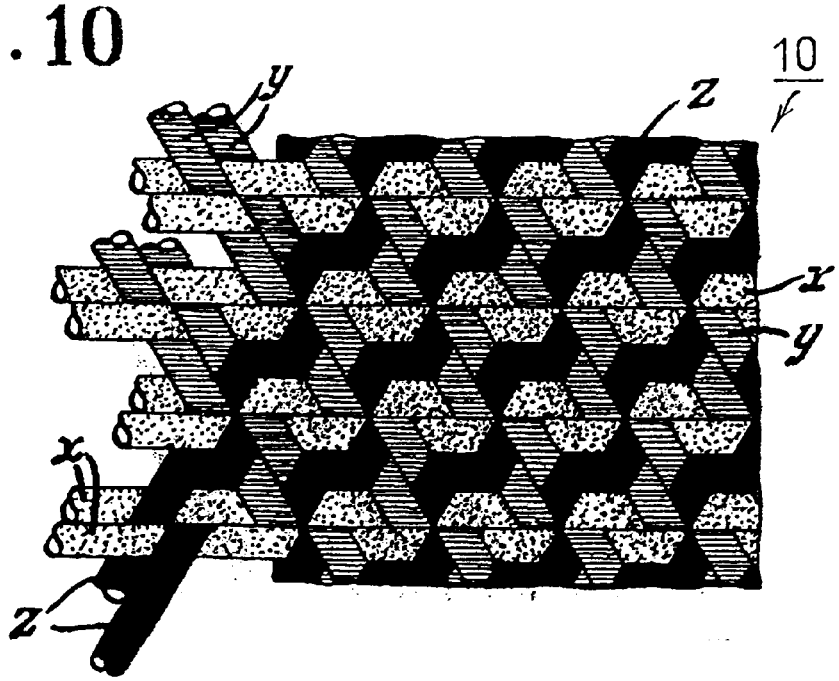
Figure 13:
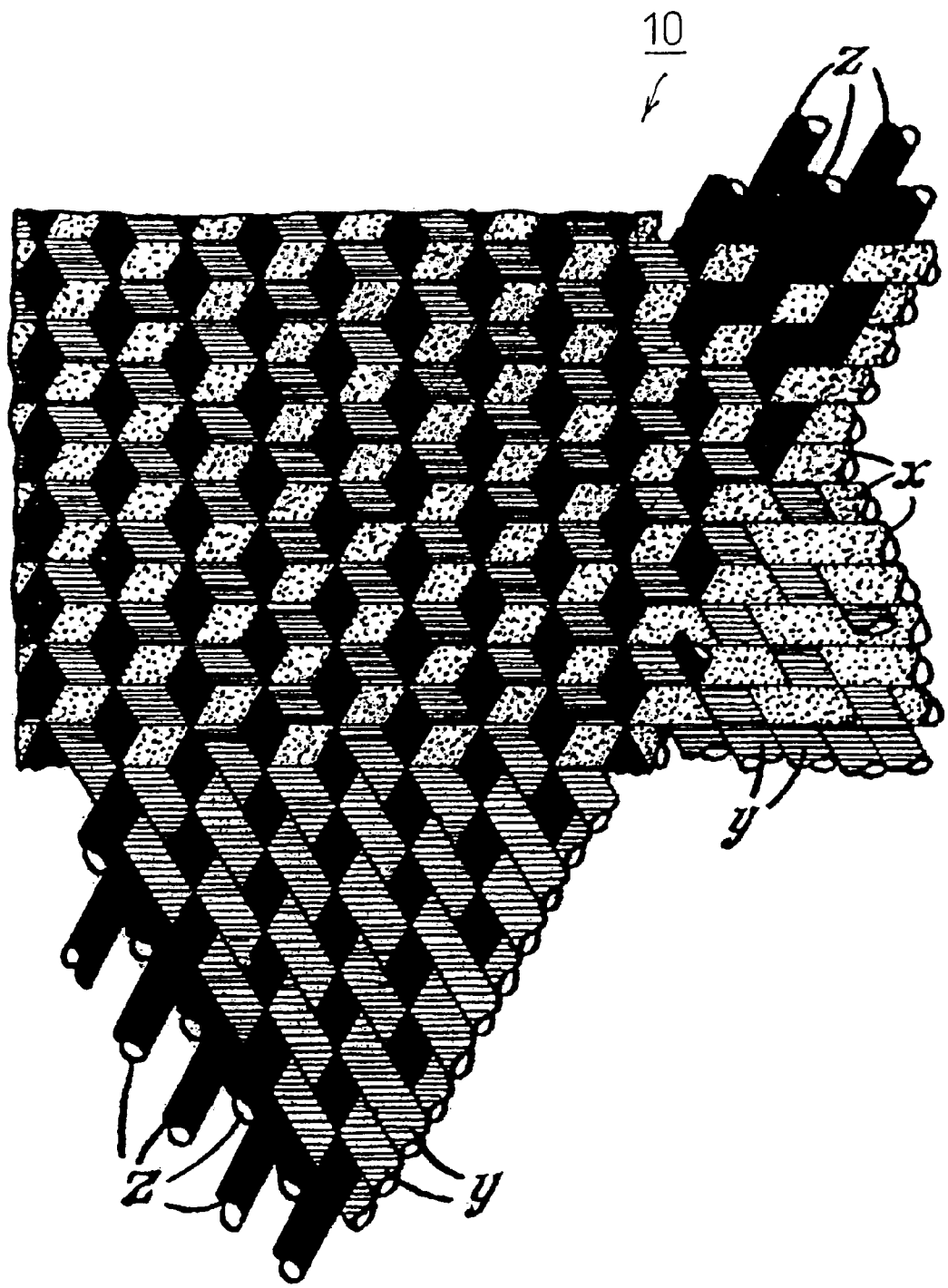

FIGS. 7 through 16 show examples of the triaxial fabrics. These examples have been proposed in U.S. Pat. No. RE28,155 (U.S. Ser. No. 515,028). In FIG. 7, the yarn paths x, y and z are each defined by a single thread and are spaced from one another to define therebetween spaces s. In FIG. 8, the yarn path x is defined by two threads and the yarn paths y and z are each defined by a single thread; the yarn paths x, y and z are spaced from one another to define therebetween space s. In FIG. 9, the yarn paths x, y and z are each defined by two threads and there is no space s therebetween. In FIG. 10, the number of threads of each yarn path is the same as that in FIG. 9, but the way the threads of the yarn paths are woven (the lay of the threads) is different. In FIG. 11, the yarn path y is defined by two threads and the yarn paths x and z are each defined by a single thread; the way the threads of the yarn paths y1 and y2 are woven is different, the yarn paths x, y and z are spaced from one another to define therebetween spaces s. In FIG. 12, the way the threads of the yarn paths x1, x2 and y1, y2 are woven is different again, the yarn paths x, y and z are each defined by two threads and the yarn paths x, y and z are spaced from one another to define therebetween spaces s. In FIG. 13, the yarn paths x, y and z are each defined by a single thread, the threads are tightly woven so that there is no space therebetween.

Figure 16:
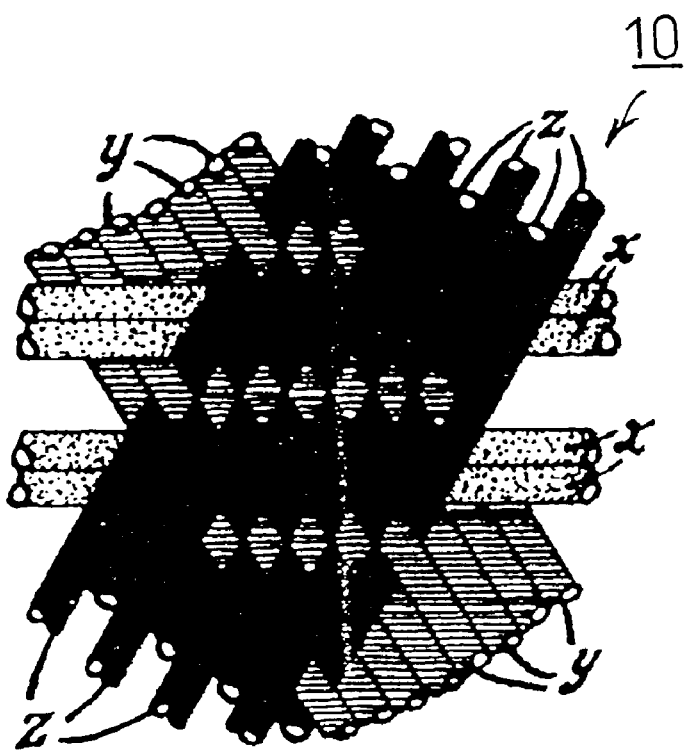

In FIG. 14, the way the threads of the yarn paths x1 and x2 are woven is different, the yarn path x is defined by two threads and the yarn paths y and z are each defined by a single thread; there are spaces between the yarn paths. In FIG. 15 which shows an arrangement similar to FIG. 14, there is no space between the yarn paths. In FIG. 16, the adjacent yarn paths x are spaced from one another and there is no space between the yarn paths y or z. The strength in the direction x is less than that in the direction y or z.

The examples mentioned above can be applied to the triaxial fabric prepreg. Triaxial fabric prepregs other than those shown in the drawings can be used. The angle defined between the yarn paths x, y and z is not necessarily limited to 60° or 120°.

Figure 1:
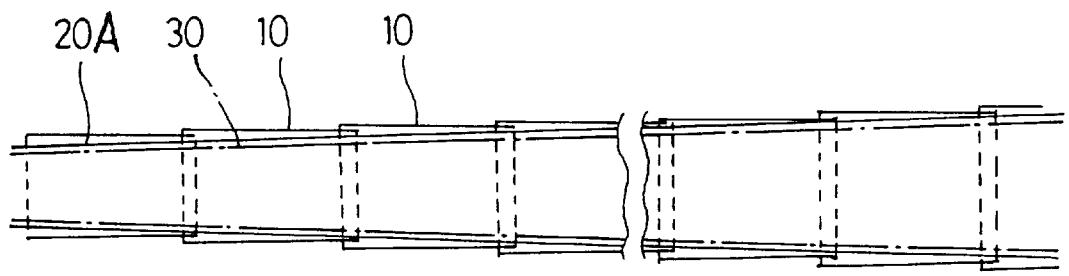
FIG. 1 is a sectional view of a skeleton of a golf club shaft made of a triaxial fabric, according to an embodiment of the present invention.
Figure 1A:
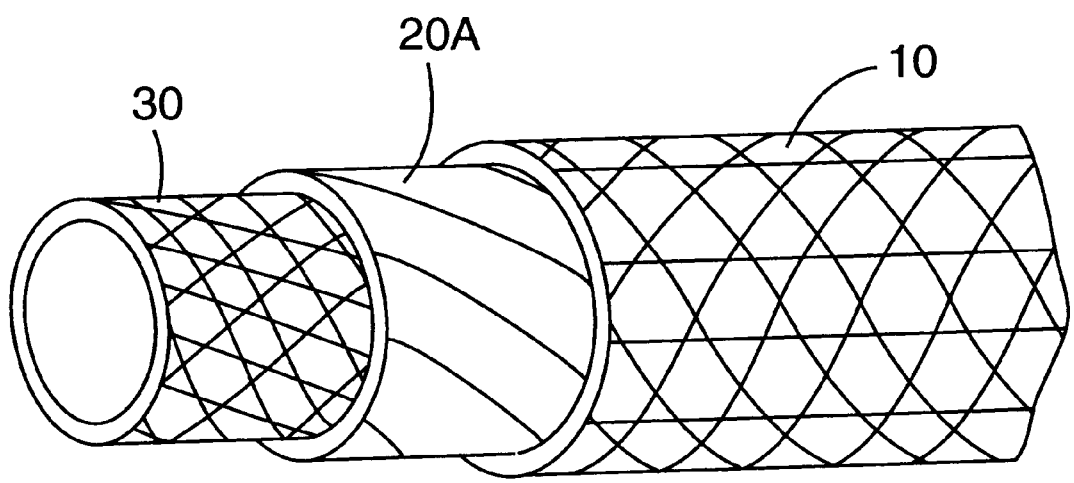
FIG. 1A is a fragmentary perspective view of a portion of the golf club shaft of FIG. 1.

FIG. 1 shows a golf club shaft using triaxial fabric prepregs in the form of discrete units 10, each of which is wound into a tubular shape, having different diameters, and the same is wound around a core member. A center prepreg 20A which is made of a diagonal fiber prepreg and/or longitudinal prepreg is wound around a core over the overall length of the shaft. A plurality of a predetermined length of tubular triaxial fabric prepregs 10 having different diameters are step-wise wound around the central prepreg 20A, so that the adjacent triaxial fabric prepregs 10 partly overlap in the axial direction. It is possible to further provide an isometric tubular triaxial fabric prepreg layer 30 over the overall length of the shaft as indicated by phantom lines. As shown in FIG. 1A, the triaxial fabric of the units 10 may have yarn paths directions different from those of the triaxial fabric of the prepreg layer 30.

Figure 5:
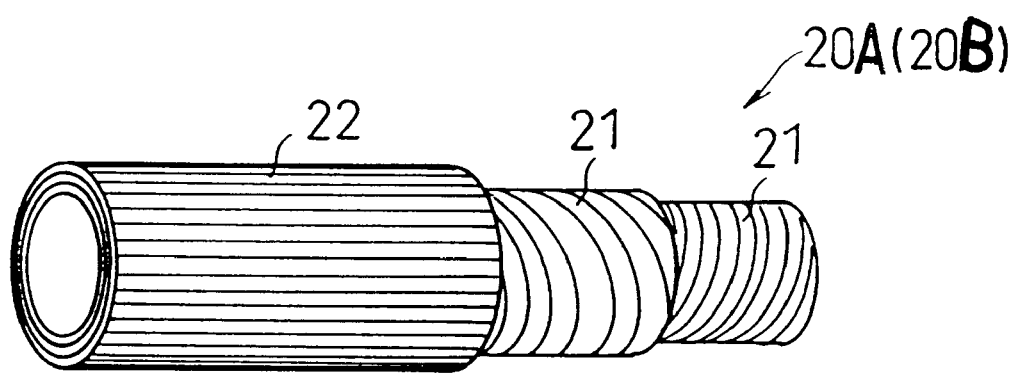
FIG. 5 is a schematic perspective view of an example of a central prepreg consisting of a diagonal fabric prepreg and a longitudinal fabric prepreg.

FIG. 5 shows an example of the central prepreg 20A which is made of a tubular diagonal fiber prepreg 21 and a tubular longitudinal fiber prepreg 22.

Figure 2:
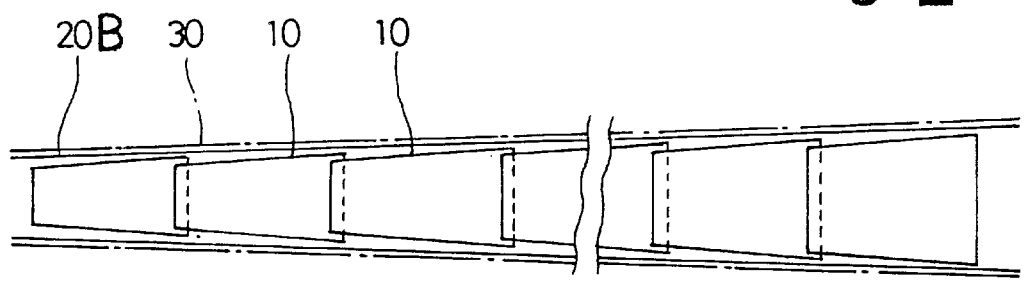
FIG. 2 is a sectional view of a skeleton of a golf club shaft made of a triaxial fabric, according to another embodiment of the present invention.

FIG. 2 shows a golf club shaft comprising a plurality of a predetermined length of tubular triaxial fabric prepregs 10 and an outer prepreg 20B which is located outside of the tubular triaxial fabrics 10. The adjacent triaxial fabric prepregs 10 having different diameters are partly overlapped in the axial direction as same as the example shown in FIG. 1.

The prepregs 10, 20A, 20B and 30 wound around a core member are thereafter hardened to form a golf club shaft. Although the golf club shaft thus obtained is light, the user would feel as if it were a steel shaft. If different specifications or properties of triaxial fabric prepregs 10 are used, a variety of fiber density distributions in the axial direction can be provided.

Figure 3:
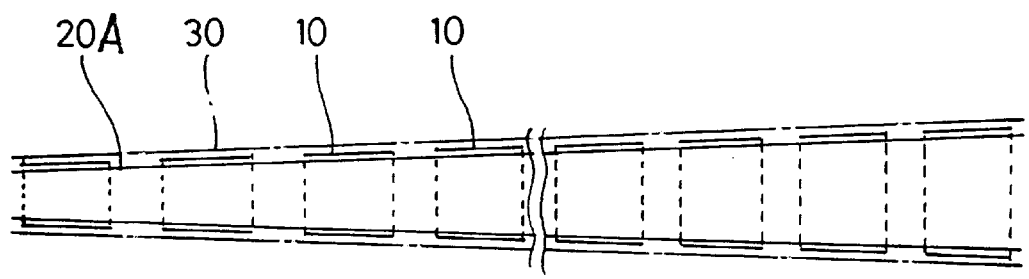
FIG. 3 is a sectional view of a skeleton of a golf club shaft made of a triaxial fabric, according to another embodiment of the present invention.

FIG. 3 shows an embodiment in which the triaxial fabric prepregs 10 of a predetermined length are spaced and wound around the central prepreg 20A. The specification of the triaxial fabric prepregs 10, the distance therebetween and/or the length thereof can be made different, to vary the fiber density in the axial direction, or the kind or physical property of the fiber can be made so as to be non-uniform in the axial direction to vary the bending rigidity, torsional rigidity or deformation rigidity (rigidity against the partial collapse of the circular shape in section), etc., in the axial direction.

Figure 4:
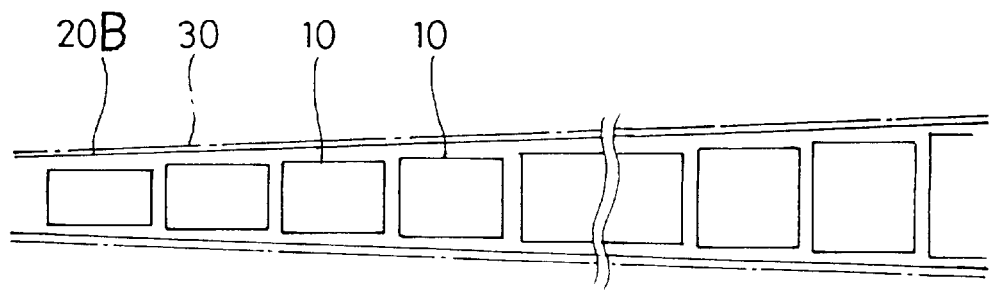
FIG. 4 is a sectional view of a skeleton of a golf club shaft made of a triaxial fabric, according to another embodiment of the present invention.

FIG. 4 shows an embodiment in which the outer prepreg 20B is wound onto the tubular triaxial fabric prepregs 10 which are spaced at a predetermined distance from one another in the axial direction, unlike the embodiment shown in FIG. 3 in which the tubular triaxial prepregs 10 are wound onto the tubular central prepreg (diagonal fiber prepreg and/or longitudinal fiber prepreg) 20A. Alternatively, it is also possible to provide the diagonal fiber prepreg 20A and/or the longitudinal fiber prepreg 20B in and around the tubular triaxial prepregs 10. The embodiments illustrated in FIGS. 2 and 4 can be advantageously applied to an internal pressure molding process, in which the coiled prepregs are disposed within a molding die and the molding is carried out while pressuring the center cavity portion thereof. Consequently, a golf club shaft having a smooth or flat outer surface can be obtained.

In the above-mentioned embodiments, as indicated by phantom lines, it is possible to provide an isometric tubular triaxial fabric prepreg 30 over the overall length of the shaft as mentioned above. The isometric tubular triaxial fabric prepreg 30 can be provided in addition to the central prepreg 20A or the outer prepreg 20B or it can be provided in place of the central prepreg 20A or the outer prepreg 20B. The tubular triaxial fabric prepregs 10 can be made of plural plies of prepregs (multi-layered prepregs).

In short, according to the most significant feature of the present invention, either the fiber density, the kind of the fiber, the physical property of the fiber, or a combination of these factors, of the three-directional yarn paths of the tubular triaxial fabric prepreg 10, is made non-uniform in the axial direction, so that different properties of golf club shafts can be obtained. Presence or absence of other layers of the golf club shaft or the structure thereof is not the subject of the present invention.

As can be understood from the above discussion, according to the present invention, the triaxial fabric layers are used, and either the fiber density, the kind of the fiber, the physical property of the fiber of the triaxial fabric layers, or a combination of these factors, is made non-uniform in the axial direction so as to meet required specifications of the shaft.

What is claimed is:

1. A golf club shaft having a longitudinal axis and butt and tip ends and made of a composite of fiber material and a synthetic resin material, wherein said fiber material comprises a plurality of discrete cylindrical or frusto-conical units made of triaxial fabric having fibers defining three yarn paths of three directions, said units having an arrangement along the longitudinal axis of the shaft such as to be respectively located at different locations along the longitudinal axis of the shaft with at least two of the units being located on the butt end side and with at least two of the units being located on the tip end side of said shaft; wherein said units have characteristics of length, thickness, fiber density, kind of fiber, and physical property of fiber; and wherein one or more of said characteristics or the arrangement of the discrete units along the longitudinal axis of the shaft is varied in accordance with a required specification of said shaft.

2. A golf club shaft according to claim 1, wherein said fiber density of said discrete triaxial fabric units is determined based on either the other of said characteristics, the arrangement of said units, or both the other of said characteristics and the arrangement of said units.

3. A golf club shaft according to claim 2, wherein the yarn paths in three directions have different numbers of fibers.

4. A golf club shaft according to claim 2, wherein the arrangement of the discrete triaxial fabric units is such that the units are spaced from one another along the longitudinal axis of the shaft.

5. A golf club shaft according to claim 1, wherein said discrete triaxial fabric units have different winding radii and mutually partially overlap each other along the longitudinal axis of said shaft.

6. A golf club shaft according to claim 1, wherein a unitary frusto-conical layer of triaxial fabric extends along the longitudinal axis of the shaft from said butt end to said tip end in combination with said discrete units of triaxial fabric, the directions of the yarn paths of the triaxial said unitary layer being different from the directions of the yarn paths of the triaxial fabric of fabric of said discrete units.

7. A golf club shaft according to claim 1, wherein said triaxial fabric includes at least one unitary frusto-conical layer which extends along the overall length of said golf club shaft, and said discrete triaxial fabric units comprise another layer which does not extend along the overall length of said golf club shaft.

8. A golf club shaft according to claim 1, wherein the fibers of said units are made from one or more of the following; carbon fiber, alumina fiber, aramid fiber, tyranno fiber, amorphous fiber, or glass fiber.

9. A golf club shaft according to claim 1, wherein the physical property of the either comprises a high tensile strength or a high tensile elasticity modulus, or a combination thereof.

10. A golf club shaft having a longitudinal axis and butt and tip ends and made of a composite of fiber material and a synthetic resin material, the fiber material including a plurality, of annular layers of fabric superimposed on one another and surrounding said longitudinal axis, wherein one of said layers of fiber material comprises a plurality of discrete cylindrical or frust-oconical units made of triaxial fabric having three yarn paths of three different directions, said units being respectively located at different locations along the longitudinal axis of the shaft over at least a portion of the length of the shaft and at least two of said units being located at one of said ends of the shaft.

11. A golf club shaft as defined in claim 10, wherein said discrete units are spaced from one another along said longitudinal axis of the shaft.

12. A golf club shaft as defined in claim 10, wherein said discrete units are arranged so that along said longitudinal axis of the shaft neighboring ones of said discrete units partially mutually overlap one another.

13. A golf club shaft as defined in claim 10, wherein said discrete units have different radii which radii change in accordance with the position of the units along the longitudinal axis of the shaft.

* * * * *